(12) United States Patent
Schlepple et al.

(10) Patent No.: US 12,710,603 B2
(45) Date of Patent: Aug. 18, 2026

(54) OPTICAL CONNECTOR WITH KINEMATIC COUPLING

(71) Applicant: Cisco Technology, Inc., San Jose, CA (US)

(72) Inventors: Norbert Schlepple, Macungie, PA (US); Shawn X. Wang, Carlsbad, CA (US); Eng Wen Ong, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 18/416,506

(22) Filed: Jan. 18, 2024

(65) Prior Publication Data

US 2025/0237820 A1 Jul. 24, 2025

(51) Int. Cl.
*G02B 6/42* (2006.01)

(52) U.S. Cl.
CPC .................................. *G02B 6/4206* (2013.01)

(58) Field of Classification Search
CPC ....... G02B 6/42; G02B 6/4206; G02B 6/4219
See application file for complete search history.

(56) References Cited

U.S. PATENT DOCUMENTS 9,606,305 B1 * 3/2017 Yu ............................ G02B 6/32
2006/0280410 A1 * 12/2006 Fujiwara ............. G02B 6/4292 385/88
2010/0008624 A1 * 1/2010 Singer ...................... G02B 6/26 385/24
2011/0064358 A1 * 3/2011 Nishimura ............ G02B 6/425 385/47
2014/0099059 A1 * 4/2014 Pommer .............. G02B 6/4201 385/33
2014/0153881 A1 6/2014 Liff et al.
2015/0309261 A1 * 10/2015 Kobyakov ............ G02B 6/124 385/14
2016/0282570 A1 * 9/2016 Nishimura ........... G02B 6/4227
2017/0038539 A1 * 2/2017 Kon .................... H01S 5/02255
2018/0017744 A1 * 1/2018 DeMeritt ............. G02B 6/4259
2018/0329159 A1 11/2018 Mathai et al.
2020/0096713 A1 * 3/2020 Meister ................ G02B 6/4219
2021/0373247 A1 12/2021 Haase et al.
2023/0061940 A1 3/2023 Huang et al.
2023/0221507 A1 7/2023 Taha et al.
2023/0393348 A1 * 12/2023 Ma ...................... G02B 6/4261

* cited by examiner

*Primary Examiner* — Tina Wong
(74) *Attorney, Agent, or Firm* — Patterson + Sheridan, LLP

(57) ABSTRACT

The present disclosure describes various optical systems with an optical connector. An optical system includes an integrated circuit and a connector. The integrated circuit includes a grating coupler array. The connector optically couples a plurality of optical fibers to the grating coupler array. The connector engages the integrated circuit at a first attachment point, a second attachment point, and a third attachment point. The first attachment point, second attachment point, and third attachment point are arranged such that a center of optical signals from the plurality of optical fibers remains substantially aligned with a center of the grating coupler array despite thermal expansion that occurs during operation of the integrated circuit.

19 Claims, 9 Drawing Sheets

800
112
112
104
602
604
110
110
106
108

OPTICAL CONNECTOR WITH KINEMATIC COUPLING

TECHNICAL FIELD

Embodiments presented in this disclosure generally relate to optical devices. More specifically, embodiments disclosed herein relate to an optical connector with kinematic coupling.

BACKGROUND

An optical connector optically couples optical signals into an integrated circuit (e.g., a photonic integrated circuit). During operation, the optical connector and the integrated circuit may increase in temperature. The optical connector and the integrated circuit, however, may have different coefficients of thermal expansion (CTEs) and thus, may expand at different rates during operation, which may cause optical misalignment. Existing optical connectors use different materials and attachment mechanisms to manage the mismatched CTEs and to keep the optical connector detachable from the integrated circuit. For example, these connectors may use CTE-matched optical components (e.g., lenses) and CTE-mismatched mechanical components (e.g., latches). These materials and attachment mechanisms, however, may reduce reliability, limit the types of optical coupling (e.g., may not work for butt coupling), and/or be burdensome to operate.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
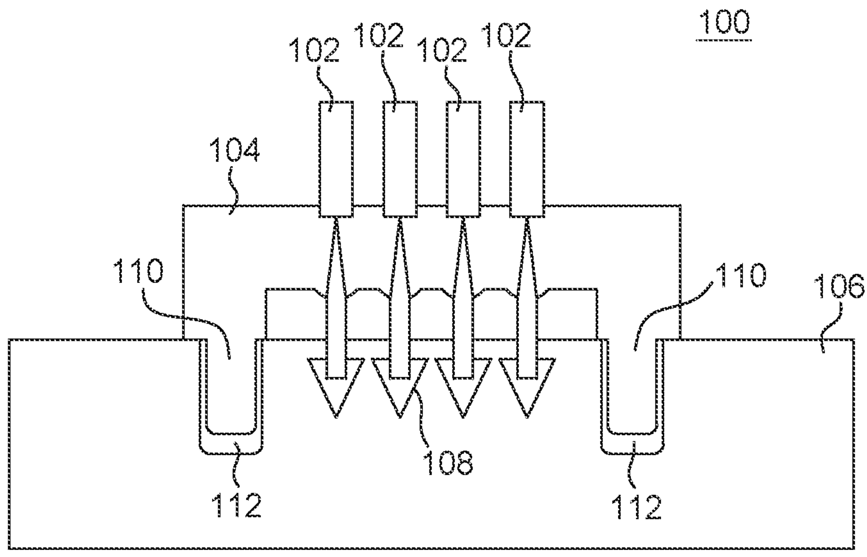
FIG. 1 illustrates an example optical system.

The present disclosure describes various optical systems with an optical connector. According to an embodiment, an optical system includes an integrated circuit and a connector. The integrated circuit includes a grating coupler array. The connector optically couples a plurality of optical fibers to the grating coupler array. The connector engages the integrated circuit at a first attachment point, a second attachment point, and a third attachment point. The first attachment point, second attachment point, and third attachment point are arranged such that a center of optical signals from the plurality of optical fibers remains substantially aligned with a center of the grating coupler array despite thermal expansion that occurs during operation of the integrated circuit.

According to another embodiment, a method includes receiving, by a connector, optical signals from a plurality of optical fibers and directing, by the connector, the optical signals to a grating coupler array of an integrated circuit. The connector engages the integrated circuit at a first attachment point, a second attachment point, and a third attachment point. The first attachment point, second attachment point, and third attachment point are arranged such that a center of the optical signals remains substantially aligned with a center of the grating coupler array despite thermal expansion that occurs during operation of the integrated circuit.

According to another embodiment, an optical system includes a plurality of optical fibers, a connector, and an integrated circuit. The connector receives a plurality of optical signals from the plurality of optical fibers. The integrated circuit includes a grating coupler array. The integrated circuit receives the plurality of optical signals from the connector. The connector includes a first peg, a second peg, and a third peg that engage the integrated circuit such that the first, second, and third pegs are arranged such that a center of the plurality of optical signals remains substantially aligned with a center of the grating coupler array despite thermal expansion that occurs during operation of the integrated circuit.

EXAMPLE EMBODIMENTS

The present disclosure describes optical systems that include an optical connector that optically couples optical signals into a grating coupler array in an integrated circuit. The connector includes a first attachment point, a second attachment point, and a third attachment point that engage the integrated circuit. The first, second, and third attachment points are arranged radially around a center of the grating coupler array such that a center of the optical signals leaving the connector are substantially aligned with the center of the grating coupler array. Thermal expansion occurs radially about a point on the connector through which the center of the optical signals passes and about the center of the grating coupler array, and as a result, the center of the optical signals may remain substantially aligned with the center of the grating coupler array even if the connector and the integrated circuit expand at different rates when temperatures rise (e.g., due to different coefficients of thermal expansion).

In certain embodiments, the optical systems provide several technical advantages. For example, as a result of the radial arrangement of the first, second, and third attachment points, optical alignment may be improved even though the connector and the integrated circuit have mismatched CTEs. Because the center of the optical signals and the center of the grating coupler array may be aligned with each other prior to operation, the center of the optical signals and the center of the grating coupler array may remain substantially aligned during and after thermal expansion has occurred. This alignment may improve optical coupling during operation. Additionally, the attachment points may allow the optical connector to be detachable from the integrated circuit.

FIG. 1 illustrates an example optical system 100. As seen in FIG. 1, the system 100 includes one or more waveguides 102 (which may be referred to as optical fibers), a connector 104, and an integrated circuit 106. Generally, the connector 104 optically couples the waveguides 102 to the integrated circuit 106. The connector 104 may be positioned above the integrated circuit 106 and may couple directly to the integrated circuit 106 at one or more attachment points.

The system 100 may include any number of waveguides 102 that carry optical signals to the connector 104. The waveguides 102 may physically couple into the connector 104. The connector 104 then directs the optical signals from the waveguides 102 towards a grating coupler array 108 in the integrated circuit 106. The system 100 may include any number of waveguides 102 that carry any number of optical signals.

The connector 104 may physically couple to the waveguides 102 and the integrated circuit 106. Generally, the connector 104 physically couples to the integrated circuit 106 at one or more attachment points. Any number of attachment points (e.g., two, three, four, etc.) may be used. In the example of FIG. 1, each attachment point includes a peg 110 that extends from the connector 104 and a cavity 112 defined by the integrated circuit 106. The pegs 110 engage the cavities 112 to couple the connector 104 to the integrated circuit 106. Coupling the connector 104 to the integrated circuit 106 by inserting the pegs 110 into the cavities 112 may align the connector 104 with the grating coupler array 108 in the integrated circuit 106. When the connector 104 is aligned with the grating coupler array 108, the connector 104 directs the optical signals from the waveguides 102 into the grating coupler array 108.

In certain embodiments, the attachment points (e.g., the pegs 110 and the cavities 112) are arranged such that a center of the optical signals from the waveguides 102 remain substantially aligned with a center of the grating coupler array 108 despite thermal expansion that occurs during operation of the integrated circuit 106. For example, the attachment points may be positioned such that thermal expansion occurs radially about the center of the grating coupler array 108 and about the portion of the connector 104 through which a center of the optical signals pass. As a result, the center of the optical signals leaving the connector 104 remains substantially aligned with the center of the grating coupler array 108 despite thermal expansion that occurs during operation of the system 100. When the grating coupler array 108 is a two-dimensional array of grating couplers (e.g., square or rectangular), another point (e.g., a point on the connector 104 through which the center of the optical signals leaving the connector 104 passes) is considered to remain substantially aligned with the center of the grating coupler array 108 if the point remains within 1 micrometer (micron) of the center of the grating coupler array 108 within a 0.4 millimeter radius of the center of the grating coupler array 108 over a fifty degree Celsius temperature range or shift. If the grating coupler array 108 is one-dimensional (e.g., a linear arrangement of grating couplers), then the point is considered to remain substantially aligned with the center of the grating coupler array 108 if the point remains within five microns of the center of the grating coupler array 108 within a 1.9 millimeter radius of the center of the grating coupler array 108 over a fifty degree Celsius temperature range or shift. As a result, the connector 104 and the integrated circuit 106 provide improved or more stable optical coupling, even though the connector 104 and the integrated circuit 106 have different coefficients of thermal expansion and expand at different rates during operation.

In some embodiments, the attachment points are positioned substantially equidistant from the center of the grating coupler array 108. The attachment points may be considered substantially equidistant from a point (e.g., the center of the grating coupler array 108) if the distances between the attachment points and the point are within one millimeter of each other.

Figure 2:
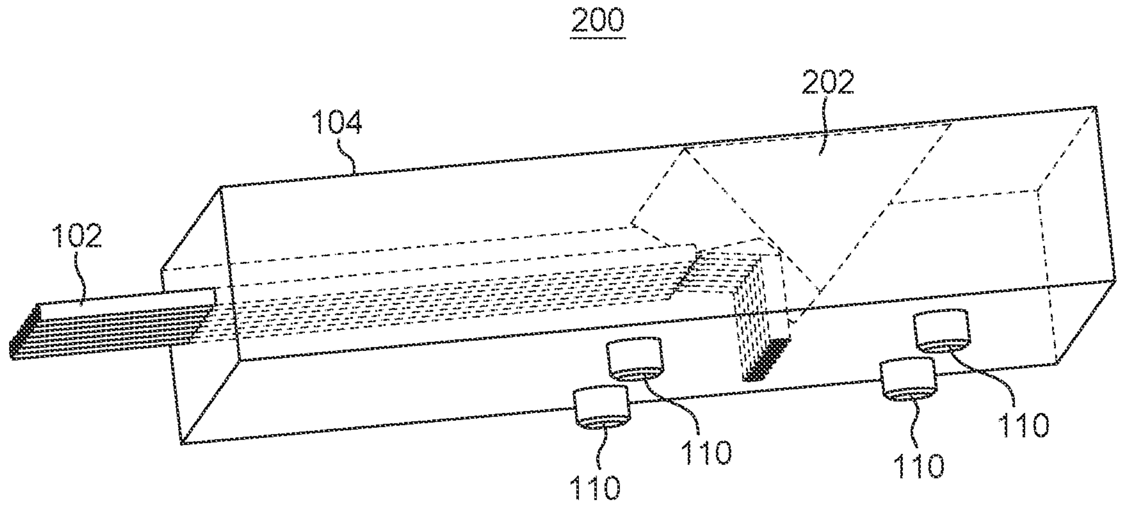
FIG. 2 illustrates an example optical system.

FIG. 2 illustrates an example optical system 200. As seen in FIG. 2, the system 200 includes a connector 104. One or more waveguides 102 enter through a side of the connector 104. The waveguides 102 direct optical signals into the connector 104. The connector 104 includes a mirror 202 within the interior of the connector 104. The mirror 202 directs the optical signals from the waveguides 102 towards and through a bottom surface of the connector 104 (e.g., towards a grating coupler array in an integrated circuit).

The connector 104 also includes pegs 110 that extend from the bottom surface of the connector 104. As seen in FIG. 2, the pegs 110 may be positioned such that a point on the bottom surface of the connector 104 through which a center of optical signals from the waveguides 102 passes is substantially aligned with the center of a grating coupler array in an integrated circuit when the connector 104 is physically coupled to the integrated circuit by the pegs 110 (e.g., by inserting the pegs 110 into cavities defined by the integrated circuit). As a result, thermal expansion occurs radially about the point on the connector 104 and about the center of the grating coupler array, and the center of the optical signals remains substantially aligned with the center of the grating coupler array during operation even if the connector 104 and the integrated circuit have different coefficients of thermal expansion and different rates of thermal expansion. The connector 104 may direct the optical signals from the waveguides 102 down into the grating coupler array through the space between the pegs 110, including the center of the pegs 110.

Figure 3:
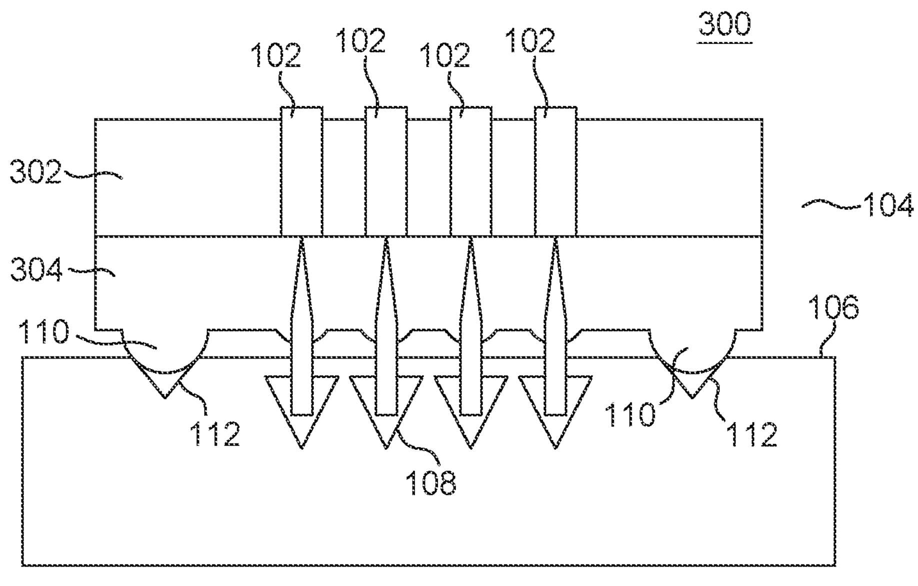
FIG. 3 illustrates an example optical system.

FIG. 3 illustrates an example optical system 300. As seen in FIG. 3, the system 300 includes one or more waveguides 102, a connector 104, and an integrated circuit 106. The waveguides 102 couple to the connector 104, and the connector 104 couples to the integrated circuit 106. The connector 104 may be positioned above the integrated circuit 106 and may direct optical signals from the waveguides 102 to a grating coupler array 108 in the integrated circuit 106.

In the system 300, the connector 104 includes a fiber array 302 and a lens array 304. The lens array 304 may be positioned between the fiber array 302 and the integrated circuit 106. The fiber array 302 receives the waveguides 102. For example, the waveguides 102 may be inserted into or positioned within the fiber array 302. The lens array 304 may include one or more lenses that direct optical signals from the waveguides 102 towards the grating coupler array 108.

Additionally, the system 300 includes one or more attachment points that include pegs 110 extending from the connector 104 and the cavities 112 defined by the integrated circuit 106. The connector 104 may couple to the integrated circuit 106 at the attachment points. For example, the pegs 110 of the connector 104 may engage the cavities 112 in the integrated circuit 106 to couple the connector 104 to the integrated circuit 106. As seen in FIG. 3, the pegs 110 may be bumps that extend from the connector 104, and a portion of the bumps may be positioned within the cavities 112 to couple the connector 104 to the integrated circuit 106. In some embodiments, the attachments points are substantially equidistant from the center of the grating coupler array 108.

The attachment points may be positioned such that a center of the optical signals leaving the connector 104 are substantially aligned with a center of the grating coupler array 108. Thermal expansion occurs radially about a point on the connector 104 through which a center of the optical signals passes and about the center of the grating coupler array 108. As a result, when the bumps are positioned within the cavities 112, the connector 104 may direct the optical signals from the waveguides 102 into the grating coupler array 108. The center of the optical signals may remain substantially aligned with the center of the grating coupler array 108 despite thermal expansion of the connector 104 and the integrated circuit 106 during operation.

Figure 4:
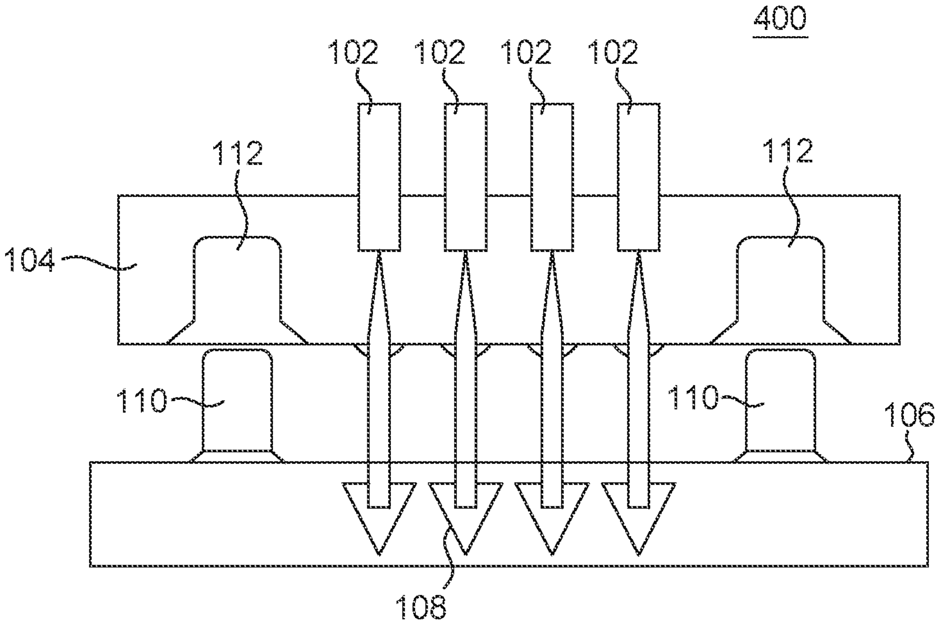
FIG. 4 illustrates an example optical system.

FIG. 4 illustrates an example optical system 400. As seen in FIG. 4, the system 400 includes one or more waveguides 102, a connector 104, and an integrated circuit 106. The connector 104 may be positioned above the integrated circuit 106 and may direct optical signals from the waveguides 102 to a grating coupler array 108 in the integrated circuit 106.

The system 400 includes one or more attachment points that are formed using pegs 110 extending from the integrated circuit 106 and cavities 112 defined by the connector 104. The connector 104 may couple to the integrated circuit 106 by inserting the pegs 110 into the cavities 112 or by positioning the pegs 110 in the cavities 112. When the pegs 110 are positioned within the cavities 112, the connector 104 may direct the optical signals from the waveguides 102 into the grating coupler array 108. The center of the optical signals leaving the connector 104 may remain substantially aligned with the center of the grating coupler array 108 despite thermal expansion of the connector 104 and the integrated circuit 106 during operation. Specifically, the thermal expansion may occur radially about the point on the connector 104 through which the center of the optical signals leaving the connector 104 passes and about the center of the grating coupler array 108. Thus, these two points may remain substantially aligned despite the connector 104 and the integrated circuit 106 having different coefficients of thermal expansion and experiencing different rates of thermal expansion. In some embodiments, the attachment points may be substantially equidistant from the center of the grating coupler array 108.

Figure 5:
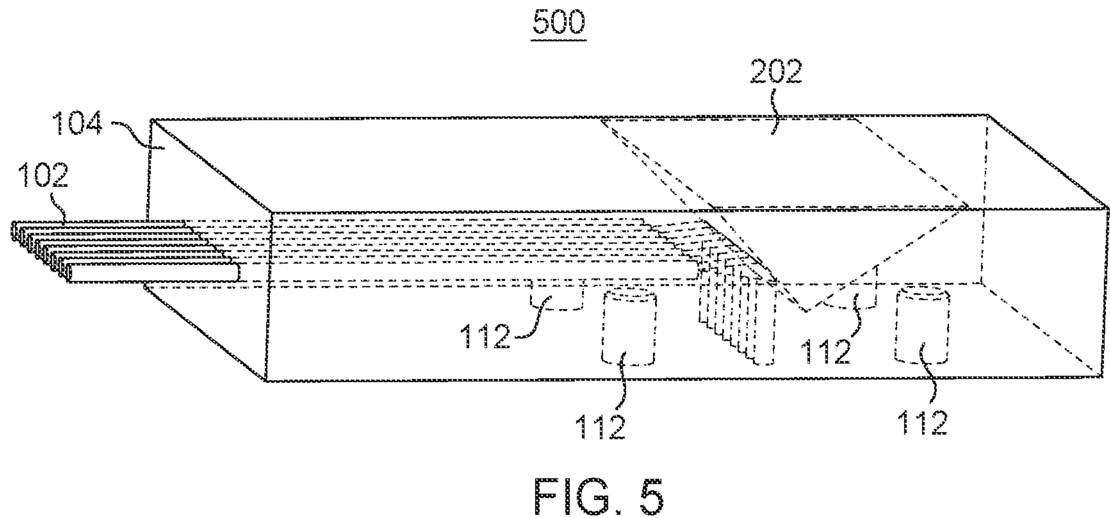
FIG. 5 illustrates an example optical system.

FIG. 5 illustrates an example optical system 500. As seen in FIG. 5, the system 500 includes a connector 104. The waveguides 102 enter through a side surface of the connector 104 and direct optical signals into the connector 104. The connector 104 includes a mirror 202 that directs the optical signals from the waveguides 102 towards and through a bottom surface of the connector 104 (e.g., towards a grating coupler array of an integrated circuit).

Additionally, the connector 104 defines multiple cavities 112 in the bottom surface of the connector 104. The cavities 112 may be positioned such that the point on the bottom surface of the connector 104 through which the center of the optical signals passes is substantially aligned with the center of the grating coupler array when the connector 104 is coupled to the integrated circuit. Thermal expansion may occur radially about the point on the bottom surface of the connector 104 and the center of the grating coupler array, and the point on the connector 104 may remain substantially aligned with the center of the grating coupler array even though the connector 104 and the integrated circuit experience different rates of thermal expansion during operation. The connector 104 directs the optical signals through the space between the cavities 112, including the center of the cavities 112. In some embodiments, the cavities 112 are substantially equidistant from a center of the grating coupler array.

Figure 6:
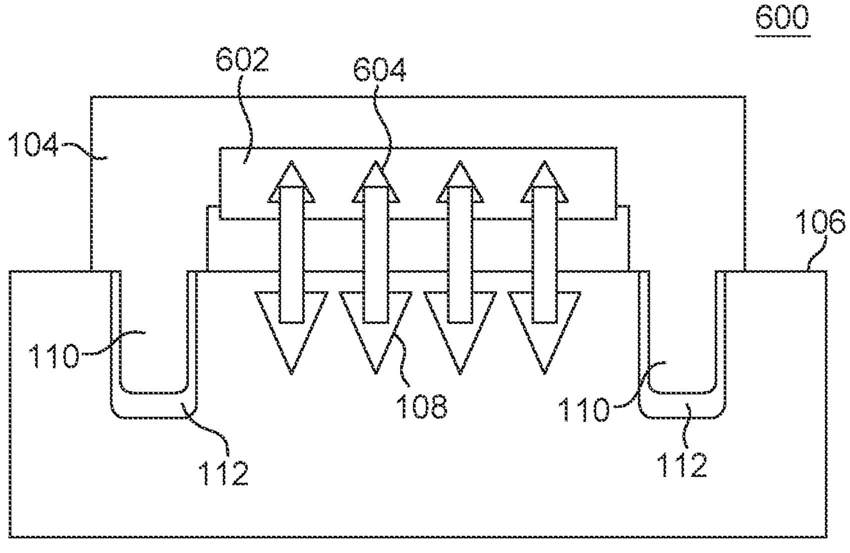
FIG. 6 illustrates an example optical system.

FIG. 6 illustrates an example optical system 600. As seen in FIG. 6, the system 600 includes the connector 104 and the integrated circuit 106. The connector 104 may couple to the integrated circuit 106 at one or more attachment points that includes the pegs 110 extending from the connector 104 and the cavities 112 defined by the integrated circuit 106. Specifically, the connector 104 couples to the integrated circuit 106 when the pegs 110 are inserted into or engage the cavities 112.

Additionally, the connector 104 includes and is coupled to an integrated circuit 602 that includes a grating coupler array 604. For example, the integrated circuit 602 may be epoxy attached to the connector 104. Waveguides may direct optical signals into the integrated circuit 602. The grating coupler array 604 may direct these optical signals into the grating coupler array 108 when the connector 104 is coupled to the integrated circuit 106 at the attachment points. Due to the arrangement of the pegs 110 and the cavities 112, thermal expansion occurs radially about the point on the integrated circuit 602 through which the center of the optical signals passes and about the center of the grating coupler array 108. As a result, the center of the optical signals remains substantially aligned with the center of the grating coupler array 108 during operation. The grating coupler array 604 continues to direct optical signals into the grating coupler array 108 despite the thermal expansion experienced by the connector 104, the integrated circuit 106, and/or the integrated circuit 602. In some embodiments, the attachment points are substantially equidistant from a center of the grating coupler array 108

Figures 7, 8:
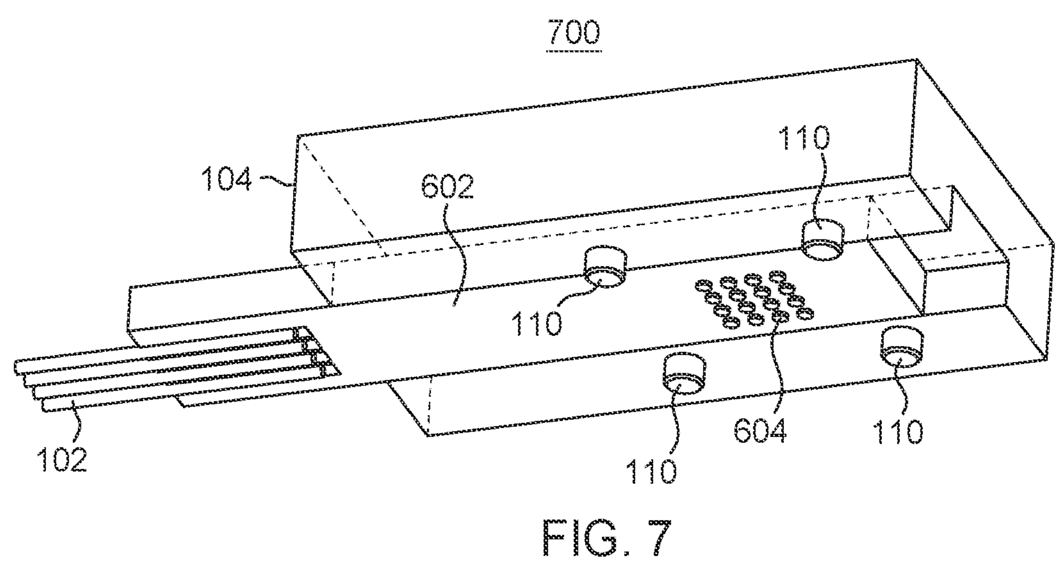
FIG. 7 illustrates an example optical system.
FIG. 8 illustrates an example optical system.

FIG. 7 illustrates an example optical system 700. As seen in FIG. 7, the system 700 includes the connector 104, which includes an integrated circuit 602. The integrated circuit 602 is attached (e.g., epoxy attached) to the connector 104. The integrated circuit 602 receives one or more waveguides 102 that direct optical signals into the integrated circuit 602. The integrated circuit 602 includes a grating coupler array 604 that directs optical signals from the waveguides 102 out of a bottom surface of the integrated circuit 602.

Additionally, the connector 104 includes one or more pegs 110 positioned on the bottom surface of the connector 104. The pegs 110 are positioned such that a point on the bottom surface of the integrated circuit 602 through which the optical signals passes may remain substantially aligned with the center of a grating coupler array when the connector 104 is coupled to an integrated circuit (e.g., by inserting the pegs 110 into cavities defined by the integrated circuit). Specifically, the positioning of the pegs 110 may result in the point on the integrated circuit 602 being substantially aligned with the center of the grating coupler array in the integrated circuit, and thermal expansion may occur radially about the point on the integrated circuit 602 and the center of the grating coupler array in the integrated circuit. As a result, the point on the integrate circuit 602 may remain substantially aligned with the center of the grating coupler array in the integrated circuit during operation even though the connector 104, the integrated circuit 602, and/or the other integrated circuit have different coefficients of thermal expansion and different rates of thermal expansion.

Moreover, when the connector 104 is coupled to the integrated circuit, the grating coupler array 604 directs optical signals into the grating coupler array of the integrated circuit. In some embodiments, the pegs 110 are substantially equidistant from a center of the grating coupler array 604, and the center of the grating coupler array 604 is positioned at the center of the pegs 110. As a result, the center of the pegs 110, the center point of the grating coupler array 604, and the center point of the grating coupler array in the integrated circuit remain substantially aligned, even though the connector 104, the integrated circuit 602, and the other integrated circuit experience thermal expansion during operation.

FIG. 8 illustrates an example optical system 800. As seen in FIG. 8, the system 800 includes a connector 104 and an integrated circuit 106. The system 800 also includes one or more attachment points formed by pegs 110 extending from the integrated circuit 106 into cavities 112 defined by the connector 104. The connector 104 couples to the integrated circuit 106 using the attachment points. For example, the connector 104 may be coupled to the integrated circuit 106 by inserting the pegs 110 into the cavities 112.

Additionally, the connector 104 includes and is attached (e.g., epoxy attached) to an integrated circuit 602 that includes a grating coupler array 604. The integrated circuit 602 may receive optical signals. The grating coupler array 604 directs the optical signals to the grating coupler array 108 in the integrated circuit 106 when the connector 104 is coupled to the integrated circuit 106 using the attachment points. Due to the positioning of the pegs 110 and the cavities 112, the center of the optical signals leaving the integrated circuit 602 is substantially aligned with the center of the grating coupler array 108. Thermal expansion occurs radially about the point on the integrated circuit 602 and the center of the grating coupler array 108 such that the point on the integrated circuit 602 and the center of the grating coupler array remain substantially aligned during operation even though the connector 104 and the integrated circuit 106 experience different rates of thermal expansion. The attachment points may also be substantially equidistant from a center of the grating coupler array 604, and the center of the grating coupler array 604 may be aligned with the center of the attachment points. As a result, the center of the grating coupler array 604 may remain substantially aligned with the center of the grating coupler array 108 despite thermal expansion during operation. In certain embodiments, the attachment points are substantially equidistant from the center of the grating coupler array 108.

Figure 9:
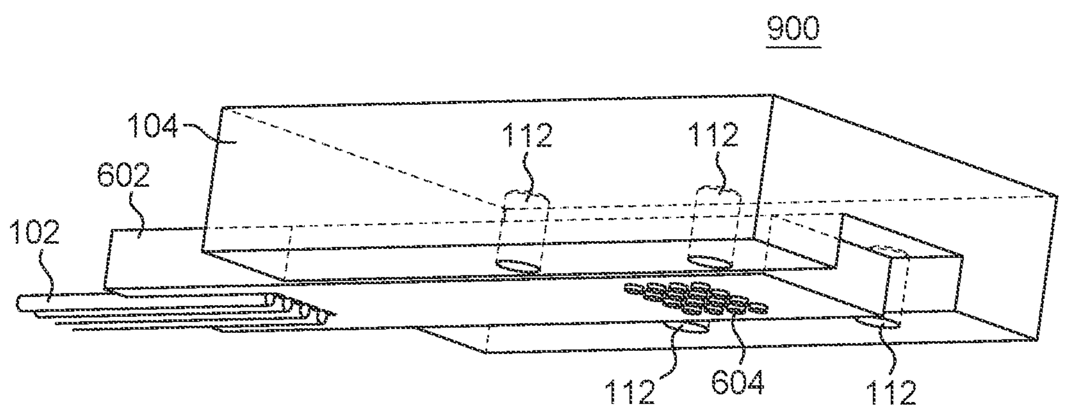
FIG. 9 illustrates an example optical system.

FIG. 9 illustrates an example optical system 900. As seen in FIG. 9, the system 900 includes a connector 104, which includes an integrated circuit 602. The integrated circuit 602 is attached (e.g., epoxy attached) to the connector 104. The integrated circuit 602 receives one or more waveguides 102 that direct optical signals into the integrated circuit 602. The integrated circuit 602 also includes a grating coupler array 604 that directs the optical signals towards and through a bottom surface of the integrated circuit 602.

Additionally, the connector 104 defines one or more cavities 112 in the bottom surface of the connector 104. The connector 104 may couple to an integrated circuit using the cavities 112. The integrated circuit 602 may be attached to the connector 104 such that a center of the optical signals leaving the integrated circuit 602 are substantially aligned with a center of the grating coupler array in the integrated circuit coupled to the connector 104. Thermal expansion occurs radially about the point on the integrated circuit 602 through which the center of the optical signals passes and about the center of the grating coupler array in the integrated circuit to which the connector 104 couples. As a result, when the connector 104 is coupled to the integrated circuit using the cavities 112, the center of the grating coupler array 604 may remain substantially aligned with the center of the grating coupler array in the integrated circuit despite the connector 104, the integrated circuit 602, and/or the other integrated circuit having different coefficients of thermal expansion and experiencing different rates of thermal expansion. In some embodiments, the cavities 112 are arranged substantially equidistant from the center of the grating coupler array in the integrated circuit that couples to the connector 104.

Figure 10:
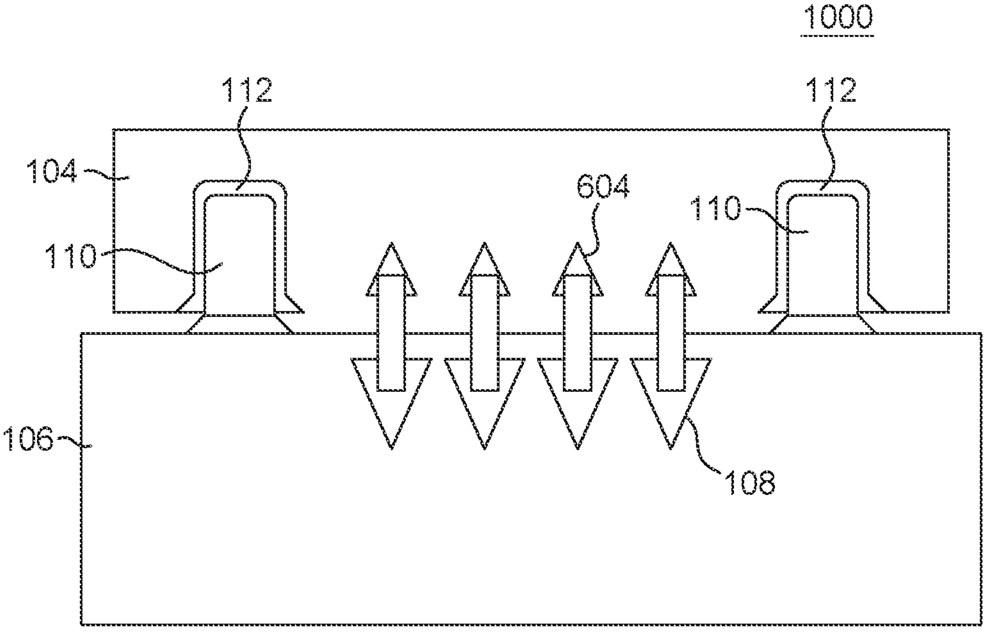
FIG. 10 illustrates an example optical system.

FIG. 10 illustrates an example optical system 1000. As seen in FIG. 10, the system 1000 includes a connector 104 and an integrated circuit 106. The connector 104 couples to the integrated circuit 106 using one or more attachment points that include pegs 110 extending from the integrated circuit 106 and cavities 112 defined by the connector 104.

In the system 1000, the connector 104 may be an integrated circuit that includes a grating coupler array 604. The connector 104 may receive optical signals from waveguides. The connector 104 then directs the optical signals to the grating coupler array 604. The grating coupler array 604 then directs the optical signals to the grating coupler array 108 in the integrated circuit 106 when the connector 104 is coupled to the integrated circuit 106. The positioning of the pegs 110 and the cavities 112 may cause a center of the optical signals leaving the connector 104 to be substantially aligned with a center of the grating coupler array 108. Thermal expansion occurs radially about the point on the connector 104 through which the center of the optical signals passes and the center of the grating coupler array 108. As a result, the center of the optical signals remains substantially aligned with the center of the grating coupler array 108 during operation even though the connector 104 and the integrated circuit 106 have different coefficients of thermal expansion and experience different rates of thermal expansion. In certain embodiments, the attachment points are positioned substantially equidistant from the center of the grating coupler array 108 when the connector 104 is coupled to the integrated circuit 106. Additionally, the attachment points may be positioned substantially equidistant from the center of the grating coupler array 604.

Figure 11:
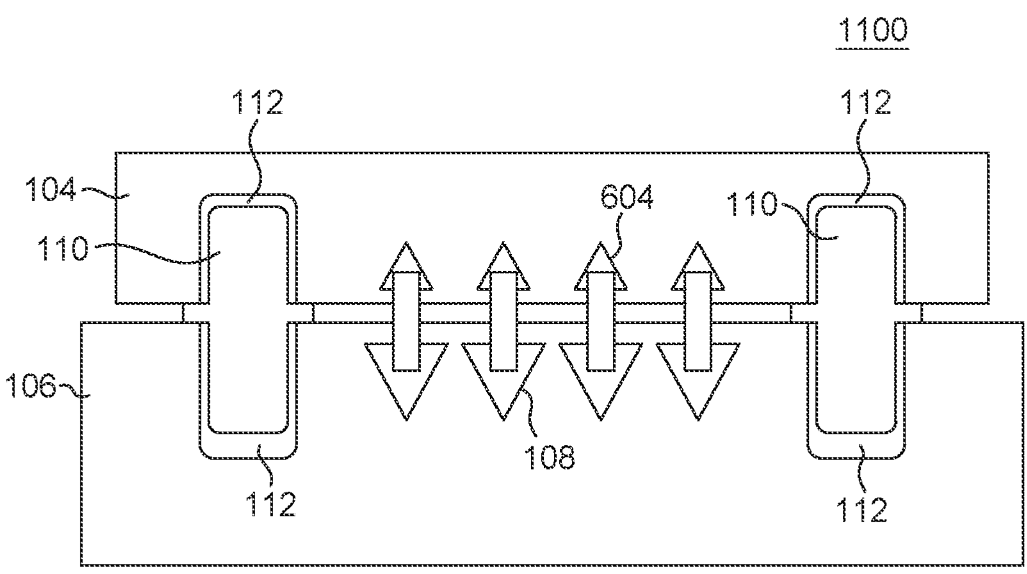
FIG. 11 illustrates an example optical system.

FIG. 11 illustrates an example optical system 1100. As seen in FIG. 11, the system 1100 includes a connector 104 and an integrated circuit 106. The connector 104 may be an integrated circuit that includes a grating coupler array 604. The integrated circuit 106 includes a grating coupler array 108. The connector 104 may receive and direct optical signals to the grating coupler array 604. The grating coupler array 604 then directs these optical signals to the grating coupler array 108 when the connector 104 is coupled to the integrated circuit 106.

The connector 104 couples to the integrated circuit 106 using one or more attachment points. As seen in FIG. 11, the attachment points include cavities 112 defined by the connector 104 and the integrated circuit 106. Additionally, the attachment points include pegs 110 that extends into the cavities 112 defined by both the connector 104 and the integrated circuit 106. The pegs 110 may be first inserted into a cavity 112 defined by the integrated circuit 106. Then, the connector 104 may be positioned on the peg 110 such that the peg 110 is inserted into a cavity 112 defined by the connector 104. The attachment points may be positioned such that a center of the optical signals leaving the connector 104 are substantially aligned with the center of the grating coupler array 108. Thermal expansion occurs radially about the point on the connector 104 through which the center of the optical signals passes and about the center of the grating coupler array 108. As a result, the center of the optical signals remains substantially aligned with the center of the grating coupler array 108 during operation even though the connector 104 and the integrated circuit 106 have different coefficients of thermal expansion and experience different rates of thermal expansion. In some embodiments, the attachment points are substantially equidistant from a center of the grating coupler array 604 and a center of the grating coupler array 108. As a result, the center of the attachment points, the center of the grating coupler array 604, and the center of the grating coupler array 108 may remain substantially aligned during operation, even though the connector 104 and the integrated circuit 106 experience thermal expansion.

Figure 12:
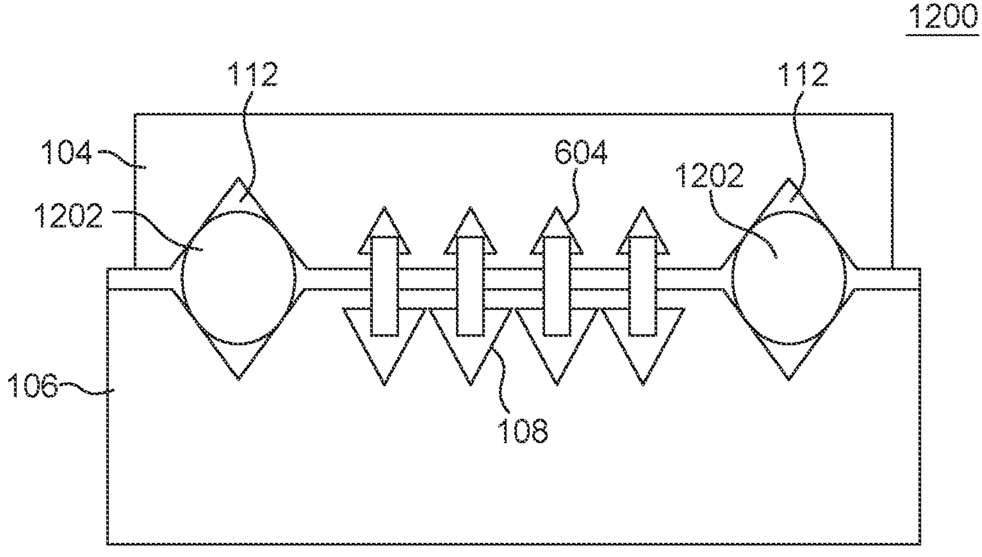
FIG. 12 illustrates an example optical system.

FIG. 12 illustrates an example optical system 1200. As seen in FIG. 12, the system 1200 includes a connector 104 and an integrated circuit 106. The connector 104 may be an integrated circuit that includes a grating coupler array 604, and the integrated circuit 106 includes the grating coupler array 108. The connector 104 may receive optical signals and direct those optical signals to the grating coupler array 604. The grating coupler array 604 may direct the optical signals to the grating coupler array 108 when the connector 104 is coupled to the integrated circuit 106.

The connector 104 couples to the integrated circuit 106 using one or more attachment points. As seen in FIG. 12, the attachment points include a cavity 112 defined by the connector 104 and the integrated circuit 106. Additionally, the attachment points include a ball bearing 1202. The connector 104 couples to the integrated circuit 106 when the ball bearing 1202 is positioned within the cavity 112. The positioning of the attachment points may cause a center of the optical signals leaving the connector 104 to be substantially aligned with the center of the grating coupler array 108. Thermal expansion occurs radially about the point on the connector 104 through which the center of the optical signals passes and about the center of the grating coupler array 108. As a result, the center of the optical signals and the center of the grating coupler array 108 remain substantially aligned during operation even though the connector 104 and the integrated circuit 106 have different coefficients of thermal expansion and experience different rates of thermal expansion.

In some embodiments, the attachment points may be positioned substantially equidistant from the center of the grating coupler array 604 and the center of the grating coupler array 108. As a result, the center of the attachment points, the center of the grating coupler array 604, and the center of the grating coupler array 108 may remain substantially aligned during operation, even though the connector 104 and the integrated circuit 106 experience different rates of thermal expansion.

Figure 13:
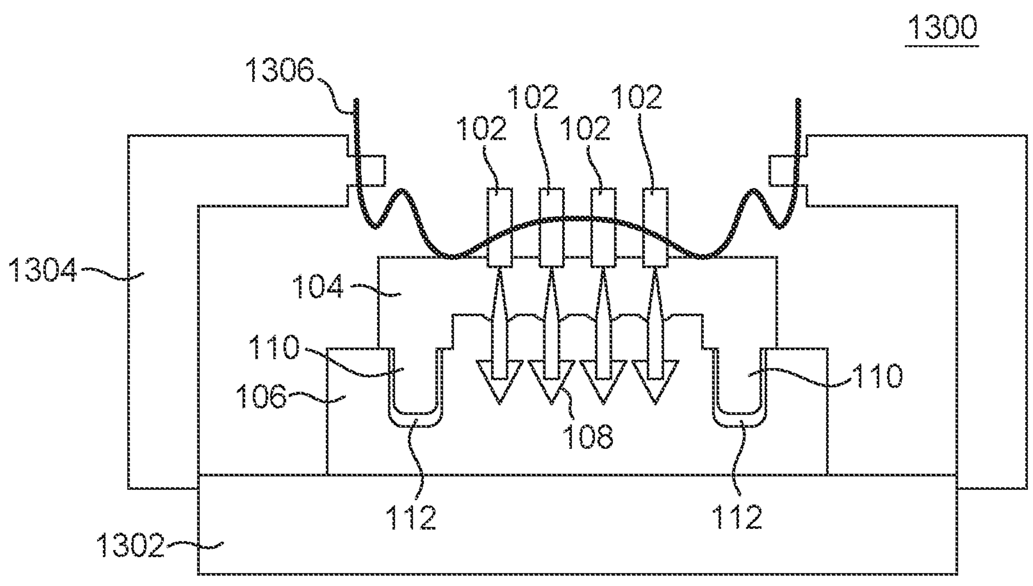
FIG. 13 illustrates an example optical system.

FIG. 13 illustrates an example optical system 1300. As seen in FIG. 13, the system 1300 includes one or more waveguides 102, a connector 104, and an integrated circuit 106, a substrate 1302, a lid 1304, and a clip 1306. Generally, the connector 104 and the integrated circuit 106 may be positioned on the substrate 1302. The lid 1304 and the clip 1306 may be positioned over the connector 104. The clip 1306 may apply pressure to the connector 104 to keep the connector 104 coupled to the integrated circuit 106.

The substrate 1302 may form a structural foundation for the integrated circuit 106 and the connector 104. In some embodiments, the substrate 1302 is a printed circuit board. The integrated circuit 106 may be attached to the substrate 1302. For example, the integrated circuit 106 may be soldered or adhered to the substrate 1302. The substrate 1302 then provides mechanical support for the integrated circuit 106.

The connector 104 may be coupled to the integrated circuit 106 using one or more attachment points that include pegs 110 extending from the connector 104 and cavities 112 defined by the integrated circuit 106, or vice versa. The connector 104 couples to the integrated circuit 106 by inserting the pegs 110 into the cavities 112. The waveguides 102 direct optical signals into the connector 104. The connector 104 directs these optical signals into the grating coupler array 108 in the integrated circuit 106 when the connector 104 is coupled to the integrated circuit 106. The positioning of the attachment points may cause a center of the optical signals leaving the connector 104 to be substantially aligned with the center of the grating coupler array 108. Thermal expansion occurs radially about the point on the connector 104 through which the center of the optical signals passes and about the center of the grating coupler array 108. As a result, the center of the optical signals and the center of the grating coupler array 108 remain substantially aligned during operation even though the connector 104 and the integrated circuit 106 have different coefficients of thermal expansion and experience different rates of thermal expansion.

In some embodiments, the attachment points are positioned substantially equidistant from the center of the grating coupler array 108. As a result, the center of the attachment points may remain substantially aligned with the center of the grating coupler array 108 during operation, even though the connector 104 and the integrated circuit 106 experience different rates of thermal expansion.

The lid 1304 and the clip 1306 may be positioned over the connector 104. In some instances, the lid 1304 may be coupled or attached to the substrate 1302. For example, the lid 1304 may be rotatably coupled to the substrate 1302. The lid 1304 may be rotated or flipped to be positioned over the connector 104. The clip 1306 and the lid 1304 may exert a force that pushes down on the connector 104 when the lid 1304 is rotated or flipped to be positioned over the connector 104. The force may keep the connector 104 coupled to the integrated circuit 106.

Figure 14:
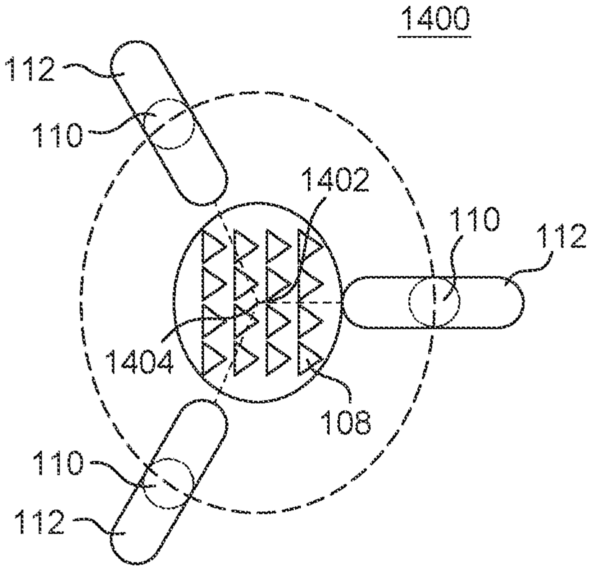
FIG. 14 illustrates an example optical system.

FIG. 14 illustrates an example optical system 1400. As seen in FIG. 14, the system 1400 includes attachment points that include pegs 110 and cavities 112. The pegs 110 may be positioned in the cavities 112 to couple a connector to an integrated circuit. The integrated circuit may include the grating coupler array 108. The design shown in FIG. 14 may be applicable to any of the systems shown in FIGS. 1 through 13.

As seen in FIG. 14, the grating coupler array 108 includes a two-dimensional arrangement of grating couplers that is square or rectangular. The attachment points are positioned radially around a center 1402 of the grating coupler array 108. A center 1404 of the optical signals directed to the grating coupler array 108 is substantially aligned with the center 1402 of the grating coupler array 108. Because thermal expansion occurs radially about the center 1402 and the center 1404, the center 1402 and the center 1404 may continue to remain substantially aligned even though the connector and the integrated circuit have different coefficients of thermal expansion and experience thermal expansion at different rates during operation. Thus, this arrangement of the attachment points and the grating coupler array 108 may improve optical coupling in certain embodiments. As discussed previously, the center 1402 and the center 1404 are considered to be substantially aligned even if a one micron misalignment occurs between the center 1402 and the center 1404 within a 0.4 millimeter radius of the center 1402 over a fifty degree Celsius shift in temperature.

Figure 15:
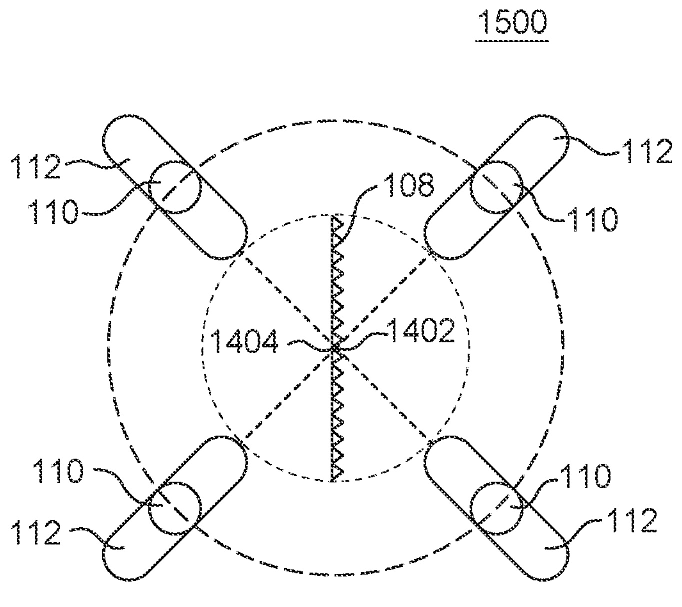
FIG. 15 illustrates an example optical system.

FIG. 15 illustrates an example optical system 1500. As seen in FIG. 15, the system 1500 includes attachment points that are used to couple a connector to an integrated circuit. The attachment points include pegs 110 in cavities 112. The pegs 110 are inserted into the cavities 112 to couple the connector to the integrated circuit. Additionally, the integrated circuit includes a grating coupler array 108. As seen in FIG. 15, the grating coupler array 108 includes a one-dimensional or linear arrangement of grating couplers. The design shown in FIG. 15 may be applicable to any of the systems shown in FIGS. 1 through 13.

The attachment points are arranged radially around the grating coupler array 108. The center 1404 of optical signals being directed to the grating coupler array 108 is substantially aligned with the center 1402 of the grating coupler array 108. Because thermal expansion occurs radially about the center 1402 and the center 1404, the center 1402 and the center 1404 may continue to remain substantially aligned even though the connector and the integrated circuit have different coefficients of thermal expansion and experience thermal expansion at different rates during operation. As discussed previously, the center 1402 and the center 1404 are considered substantially aligned even if a five micron misalignment exists between the center 1402 and the center 1404 within a 1.9 millimeter radius of the center 1402 over a fifty degree Celsius shift in temperature. Because the center 1402 and the center 1404 remain substantially aligned, the arrangement of the attachment points improve optical coupling, even though the connector and the integrated circuit experience different rates of thermal expansion during operation.

Figure 16:
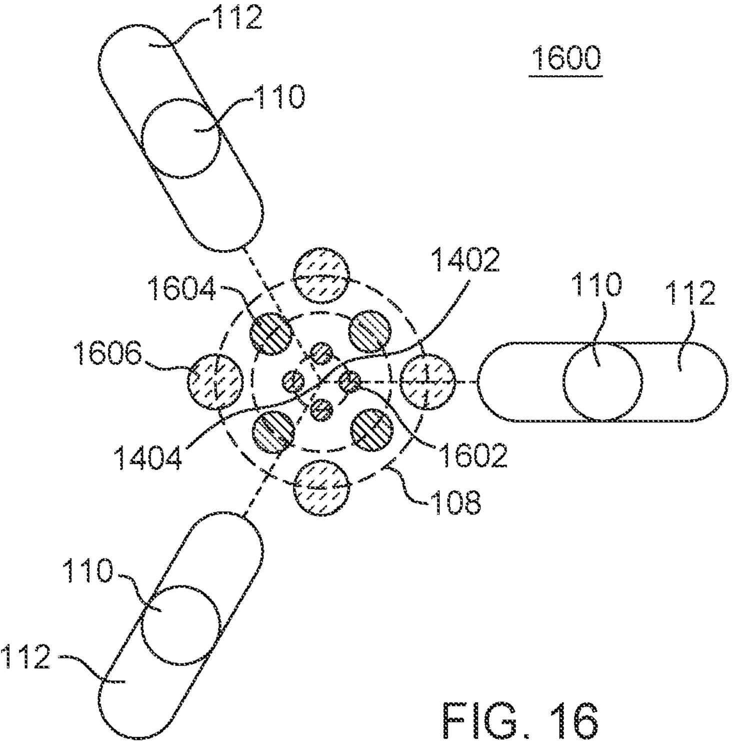
FIG. 16 illustrates an example optical system.

FIG. 16 illustrates an example optical system 1600. As seen in FIG. 16, the system 1600 includes attachment points that are used to couple a connector to an integrated circuit. The attachment points include pegs 110 and the cavities 112. The pegs 110 are inserted into the cavities 112 to connect the connector to the integrated circuit. The design shown in FIG. 16 may be applicable to any of the systems shown in FIGS. 1 through 13.

The integrated circuit includes a grating coupler array 108. The attachment points are positioned radially around the grating coupler array 108. The grating coupler array 108 may include tiers of grating couplers. In the example of FIG. 16, the grating coupler array 108 includes the grating couplers 1602, 1604, and 1606. These grating couplers 1602, 1604, and 1606 are positioned radially around the center 1402. Generally, the grating couplers that are least tolerant to misalignment are positioned closer to the center 1402. Thus, the grating coupler 1602 is the least tolerant to misalignment relative to the grating coupler 1604 and 1606, because the grating coupler 1602 is positioned closest to the center 1402. The grating coupler 1604 is more tolerant to misalignment than the grating coupler 1602 but less tolerant to misalignment than the grating coupler 1606, because the grating coupler 1604 is positioned further from the center 1402 than the grating coupler 1602 but closer to the center 1402 than the grating coupler 1606. The grating coupler 1606 is the most tolerant to misalignment relative to the grating coupler 1602 and 1604, because the grating coupler 1606 is positioned the furthest from the center 1402.

In some embodiments, the tolerance of the grating coupler to misalignment may be indicated by the grating coupler's mode field diameter (MFD). The grating coupler 1602 may have the smallest MFD. The grating coupler 1604 may have a larger MFD than the grating coupler 1602 and a smaller MFD than the coupler 1606. The grating coupler 1606 may have the largest MFD.

Due to the positioning of the attachment points, the center 1404 of the optical signals being directed to the grating coupler array 108 may be substantially aligned with the center 1402 of the grating coupler array 108. The center 1402 and the center 1404 may remain substantially aligned during operation even though the connector and the integrated circuit have different coefficients of thermal expansion and experience different rates of thermal expansion. As discussed previously, the center 1402 and the center 1404 are considered substantially aligned even if a one-micron or five-micron misalignment exists between the center 1402 and the center 1404 within a 0.4 millimeter or 1.9 millimeter radius of the center 1402 and over a 50-degree Celsius shift in temperature.

Figure 17:
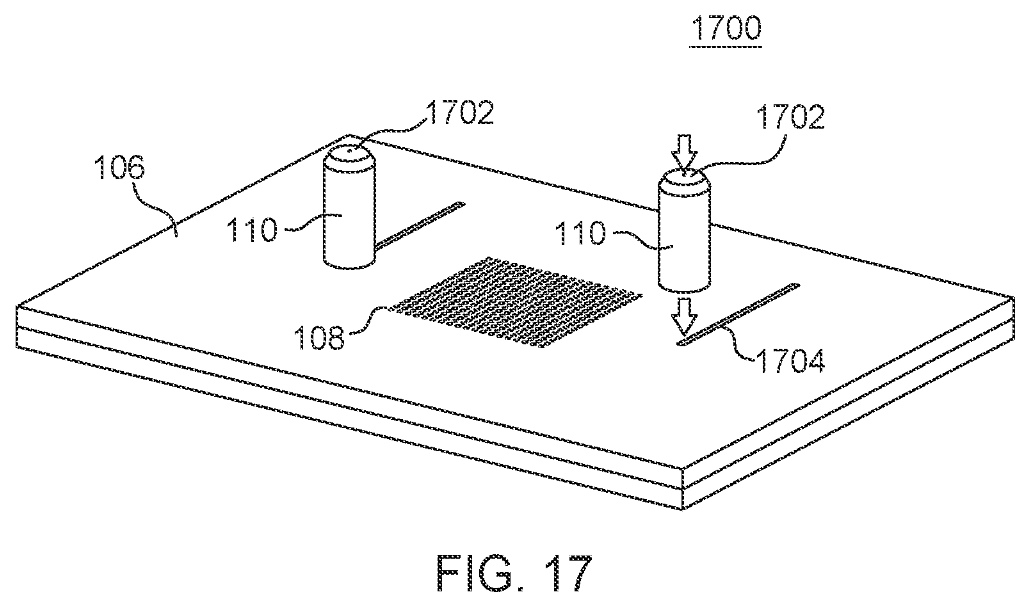
FIG. 17 illustrates an example optical system.

FIG. 17 illustrates an example optical system 1700. Generally, FIG. 17 shows an active alignment process using pegs 110. The pegs 110 may include waveguides 1702 disposed within the pegs 110 and/or positioned down a central axis of the pegs 110. The integrated circuit 106 may include grating couplers 1704 positioned separately from the grating coupler array 108. For each peg 110, an optical signal may be directed through the waveguide 1702, which directs the optical signal through the peg 110. The peg 110 may then be positioned on the integrated circuit 106 along the grating coupler 1704. The optical signal from the peg may optically couple into the grating coupler 1704. This optical coupling may be measured as the peg 110 is moved on the surface of the integrated circuit 106. When the optical coupling is at its maximum value, the peg 110 may be attached to the integrated circuit 106. In this manner, the peg 110 may be actively aligned with the integrated circuit 106 when the connector 104 is coupled to the integrated circuit 106 using the pegs 110. The peg 110 is thus aligned with or forms an attachment point. The active alignment of the pegs 110 may ensure that the connector 104 is coupled to the integrated circuit 106 such that the center of the optical signals leaving the connector 104 are substantially aligned with the center of the grating coupler array 108. As a result, the center of the optical signals may remain substantially aligned with the center of the grating coupler array 108 even though the connector and the integrated circuit 106 have different coefficients of thermal expansion and experience different rates of thermal expansion during operation.

Figure 18:
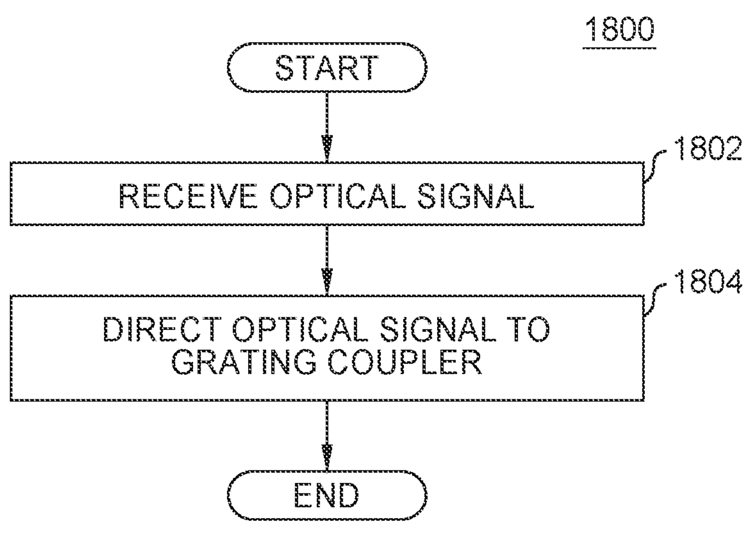
FIG. 18 is a flowchart of an example method performed by the optical system of any of FIGS. 1-17.

FIG. 18 is a flowchart of an example method 1800 performed by the optical system of any of FIGS. 1 through 17. In particular embodiments, the connector 104 performs the method 1800. By performing the method 1800, the connector 104 directs optical signals into the grating coupler array 108.

In block 1802, the connector 104 receives an optical signal. The connector 104 may receive the optical signal from a waveguide 102 attached to the connector 104. In block 1804, the connector 104 directs the optical signal to the grating coupler array 108 in the integrated circuit 106. The connector 104 may be coupled to the integrated circuit 106 using attachment points. The center of the optical signals leaving the connector 104 is substantially aligned with the center of the grating coupler array 108. The center of the optical signals remains substantially aligned with the grating coupler array 108 even though the connector 104 and the integrated circuit 106 have different coefficients of thermal expansion and experience different rates of thermal expansion during operation. The center of the optical signals is considered substantially aligned with the center of the grating coupler array 108 even if a one micron or five micron misalignment exists between the center of the optical signals and the center of the grating coupler array 108 within a 0.4 millimeter radius or 1.9 millimeter radius of the center of the grating coupler array 108 and over a 50-degree Celsius shift in temperature.

In summary, the optical connector 104 optically couples optical signals into the grating coupler array 108 in the integrated circuit 106. The connector 104 includes a first attachment point, a second attachment point, and a third attachment point that engage the integrated circuit 106. The first, second, and third attachment points are arranged radially around a center of the grating coupler array 108 such that a center of the optical signals leaving the connector 104 are substantially aligned with the center of the grating coupler array 108. Thermal expansion occurs radially about a point on the connector 104 through which the center of the optical signals passes and about the center of the grating coupler array 108, and as a result, the center of the optical signals may remain substantially aligned with the center of the grating coupler array 108 even if the connector 104 and the integrated circuit 106 expand at different rates when temperatures rise.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An optical system comprising:

an integrated circuit comprising a grating coupler array comprising a first grating coupler with a first mode field diameter and a second grating coupler with a second mode field diameter larger than the first mode field diameter, wherein first grating coupler is positioned closer to a center of the grating coupler array than the second grating coupler; and a connector arranged to optically couple a plurality of optical fibers to the grating coupler array, the connector arranged to engage the integrated circuit at a first attachment point, a second attachment point, and a third attachment point, wherein the first attachment point, second attachment point, and third attachment point are arranged such that a center of optical signals from the plurality of optical fibers remains substantially aligned with the center of the grating coupler array despite thermal expansion that occurs during operation of the integrated circuit.

2. The optical system of claim 1, wherein the connector is further arranged to engage the integrated circuit at a fourth attachment point, wherein the first attachment point, second attachment point, third attachment point, and fourth attachment point are arranged substantially equidistant from the center of the grating coupler array.

3. The optical system of claim 1, wherein the first attachment point, second attachment point, and third attachment point are arranged substantially equidistant from the center of the grating coupler array.

4. The optical system of claim 1, wherein the connector and the integrated circuit have different coefficients of thermal expansion.

5. The optical system of claim 1, wherein the first attachment point comprises (i) a cavity defined by the integrated circuit and (ii) a peg extending from the connector and arranged to engage the cavity.

6. The optical system of claim 1, wherein the first attachment point comprises (i) a cavity defined by the connector and (ii) a peg extending from the integrated circuit and arranged to engage the cavity.

7. The optical system of claim 1, wherein the first attachment point comprises a peg movably attached to the integrated circuit, wherein an optical fiber is disposed within the peg.

8. The optical system of claim 1, further comprising a clip arranged to engage the connector to exert a force that pushes the connector towards the integrated circuit.

9. The optical system of claim 1, wherein the connector comprises a mirror that directs the optical signals from the plurality of optical fibers towards the grating coupler array.

10. The optical system of claim 1, wherein the connector comprises a lens that directs the optical signals from the plurality of optical fibers to the grating coupler array.

11. A method comprising:

receiving, by a connector, optical signals from a plurality of optical fibers; and directing, by the connector, the optical signals to a grating coupler array of an integrated circuit, wherein the grating coupler array comprises a first grating coupler with a first mode field diameter and a second grating coupler with a second mode field diameter larger than the first mode field diameter, wherein first grating coupler is positioned closer to a center of the grating coupler array than the second grating coupler, wherein the connector engages the integrated circuit at a first attachment point, a second attachment point, and a third attachment point, wherein the first attachment point, second attachment point, and third attachment point are arranged such that a center of optical signals remains substantially aligned with the center of the grating coupler array despite thermal expansion that occurs during operation of the integrated circuit.

12. The method of claim 11, wherein the connector further arranged to engage the integrated circuit at a fourth attachment point, wherein the first attachment point, second attachment point, third attachment point, and fourth attachment point are arranged substantially equidistant from the center of the grating coupler array.

13. The method of claim 11, wherein the first attachment point, second attachment point, and third attachment point are arranged substantially equidistant from the center of the grating coupler array.

14. The method of claim 11, wherein the connector and the integrated circuit have different coefficients of thermal expansion.

15. The method of claim 11, wherein the first attachment point comprises (i) a cavity defined by the integrated circuit and (ii) a peg extending from the connector and arranged to engage the cavity.

16. The method of claim 11, wherein the first attachment point comprises (i) a cavity defined by the connector and (ii) a peg extending from the integrated circuit and arranged to engage the cavity.

17. The method of claim 11, wherein the first attachment point comprises a peg movably attached to the integrated circuit, wherein an optical fiber is disposed within the peg.

18. The method of claim 11, further comprising a clip arranged to engage the connector to exert a force that pushes the connector towards the integrated circuit.

19. An optical system comprising:

a plurality of optical fibers;

a connector arranged to receive a plurality of optical signals from the plurality of optical fibers; and an integrated circuit comprising a grating coupler array comprising a first grating coupler with a first mode field diameter and a second grating coupler with a second mode field diameter larger than the first mode field diameter, wherein first grating coupler is positioned closer to a center of the grating coupler array than the second grating coupler, wherein the integrated circuit is arranged to receive the plurality of optical signals from the connector, wherein the connector comprises a first peg, a second peg, and a third peg arranged to engage the integrated circuit such that the first, second, and third pegs are arranged such that a center of the plurality of optical signals remains substantially aligned with the center of the grating coupler array despite thermal expansion that occurs during operation of the integrated circuit.

* * * * *